United States Patent

Ellis et al.

[11] Patent Number: 5,954,806
[45] Date of Patent: Sep. 21, 1999

[54] METHOD TO HANDLE SCSI MESSAGES AS A TARGET

[75] Inventors: Jackson L. Ellis; Matthew C. Muresan; Graeme M. Weston-Lewis, all of Fort Collins, Colo.

[73] Assignee: LSI Logic Corporation, Milpitas, Calif.

[21] Appl. No.: 08/724,523

[22] Filed: Sep. 30, 1996

[51] Int. Cl.$^6$ ........................................ G06F 3/00
[52] U.S. Cl. ............................ 710/62; 710/105; 710/5
[58] Field of Search ................ 371/40.14; 395/386, 395/825, 827, 294, 309, 877; 386/109; 341/67; 710/62, 105, 5

[56] References Cited

U.S. PATENT DOCUMENTS

| | | | |
|---|---|---|---|
| 3,701,111 | 10/1972 | Cocke et al. | 341/67 |
| 4,864,532 | 9/1989 | Reeve et al. | |
| 4,965,801 | 10/1990 | DuLac | 371/40.14 |
| 4,979,055 | 12/1990 | Squires et al. | |
| 5,129,062 | 7/1992 | Gygi et al. | |
| 5,168,571 | 12/1992 | Hoover | 395/386 |
| 5,204,951 | 4/1993 | Keener et al. | 395/294 |
| 5,233,692 | 8/1993 | Gajjar et al. | 395/309 |
| 5,237,660 | 8/1993 | Weber et al. | 395/877 |
| 5,293,624 | 3/1994 | Andrade | 395/825 |
| 5,313,588 | 5/1994 | Nagashige | 395/825 |
| 5,347,638 | 9/1994 | Desai et al. | |
| 5,454,085 | 9/1995 | Gajjar et al. | |
| 5,504,868 | 4/1996 | Krakirian | 395/825 |
| 5,655,147 | 8/1997 | Stuber | 395/827 |
| 5,719,985 | 2/1998 | Ito | 386/109 |
| 5,758,116 | 5/1998 | Lee et al. | 395/386 |

Primary Examiner—Krisna Lim
Attorney, Agent, or Firm—David K. Lucente

[57] ABSTRACT

In a SCSI controller, unexpected messages are automatically received in response to an attention signal by receiving all of the bytes constituting the message and storing those bytes in an available register file selected from a plurality of register files in the controller. Once the entire message has been received and stored, a determination of an appropriate response is initiated. The register files are also used to hold selection information during a bus-initiated selection, so additional architecture is not required.

20 Claims, 4 Drawing Sheets

METHOD TO HANDLE SCSI MESSAGES AS A TARGET

BACKGROUND OF THE INVENTION

1. Technical Field

The present invention relates generally to an improved data processing system and in particular to an improved method and apparatus for implementing a shared bus in a data processing system. Still more particularly, the present invention relates to an improved method and apparatus for handling messages as a target device on a shared bus in a data processing system.

2. Description of the Related Art

Personal computers are becoming even more powerful, reaching levels where they are displacing minicomputers and even mainframe computers. In the process of downsizing, however, connectivity between and/or among personal computers and peripheral devices has evolved as a critical issue. Thus it has become increasingly important to be able to share peripheral devices such as hard drives, printers, scanners, or CD-ROM changers between multiple personal computers, or to be able to attach several peripherals to a single personal computer.

One means for achieving such connectivity is through use of the small computer system interface ("SCSI" or commonly called the "SCSI bus"). The SCSI bus is a popular, device independent parallel bus. Various versions of the SCSI standard have been proposed, approved, and/or adopted, including SCSI-1, SCSI-2, and SCSI-3. As used herein, the acronym "SCSI" is used to refer to any of these standards, although the SCSI-3 standard has been selected as exemplary for the purposes of describing the invention. Specifications for these standards may be obtained from the American National Standards Institute, New York, N. Y., as document numbers X3.131-1986 (SCSI-1), X3.131-1994 (SCSI-2), and X3.253-1995 (approved SCSI-3), which are incorporated by reference.

The SCSI standard provides specifications for mechanical, electrical, and functional characteristics of the bus, including definitions of the physical characteristics of the bus conductors, the electrical characteristics of the signals that the conductors carry, and the meanings of those signals (e.g., control or data).

Devices interconnected by a SCSI bus are daisy-chained together using a common 50-conductor cable. The cable comprises nine data conductors (eight for data and one for parity), nine control conductors, and other power and ground conductors. Optionally, a 68-conductor cable may be used to allow wider information transfers (data only) of 16 bits. Typically each conductor is resistively coupled to a voltage of an inactive state. To "assert" a signal onto a conductor, a device must drive the conductor to a voltage of an active state against the resistive coupling of the conductor. If not driven, a conductor will return to its inactive state.

Communication over the SCSI bus is allowed between only two devices at any given time, although up to sixteen devices may be interconnected by the same bus. When two devices communicate on the bus, one acts as an "initiator" and the other acts as a "target." Initiator devices cause target devices on the bus to perform commands whereas target devices perform commands for the initiators. There can be multiple initiators and multiple targets on a SCSI bus. The initiator originates an operation (i.e., requests an I/O process to be performed) and the target performs the operation. Transfers from storage media on a SCSI bus are typically synchronous (although an asynchronous option is defined) and follow a "handshaking" protocol involving the exchange of a "Request" signal from a target and an "Acknowledge" signal from an initiator. This exchange takes place on conductors of the bus that are specifically dedicated to the handshaking task, and is performed in connection with each individual information transfer operation on the SCSI bus.

At a higher logical level, the SCSI standard defines a protocol for managing data transfers on the bus. The protocol comprises various phases, beginning with the SCSI bus in a "bus free phase" in which the SCSI bus is idle. To initiate a data transfer process, the initiator causes the bus to enter an "arbitration bus phase." During the arbitration bus phase, each initiator arbitrates for the bus with the other initiators by asserting the appropriate SCSI bus conductor corresponding with a SCSI identifier (SCSI ID) unique to that specific initiator. Because each SCSI ID has an assigned priority, the initiator with the highest priority will win control of the bus. After winning control of the bus through arbitration, the initiator with the highest priority selects the target device of interest in a "selection bus phase." The initiator controlling the bus asserts its SCSI ID as well as the SCSI ID of the target onto the conductors of the SCSI bus. The target detects its SCSI ID on the bus conductors and responds. In a subsequent "command bus phase," the target requests a SCSI command from the initiator in control of the bus.

At still a higher logical level, the SCSI standard defines a command and status structure. Commands are used by an initiator to request a target to perform particular operations. Each SCSI command, called a SCSI command descriptor block (CDB), consists of multiple bytes, either six, ten, twelve, or sixteen bytes. The command contains information which includes a SCSI operation code indicating the type of operation to be performed. At the completion of a command, or if for some reason a command cannot be completed by the target, the target sends a status byte to the initiator to inform the initiator of its condition.

The specifications of the SCSI standard thus combine to define an interface having multiple protocol levels. The defined interface provides computer systems with device independence within a class of devices. For example, a variety of mass storage devices (such as disk drives, tape drives, optical drives, and memory caches), printers, microprocessors, and other devices may be added to a computer system without requiring modifications to system hardware or software. In addition, special features and functions of individual devices can be handled through the use of device-dependent fields and codes in the command structure.

In hard disk drives attached to a SCSI bus, a disk controller host interface is required to receive unexpected SCSI messages from initiator devices. The most common approach to receiving unexpected SCSI messages is to send an interrupt to the firmware of the host interface when an attention condition (indicating an incoming message) occurs. The firmware then accepts the message one byte at a time, decoding the bytes as they are received to determine the total number of bytes contained in the message. This results in slower exception handling and, in the worst case, may result in one interrupt per message byte.

In would be desirable to be able to receive an entire unexpected message in response to the first interrupt (i.e., the attention condition) indicating an incoming message. It would also be desirable to avoid the requirement of decoding messages by the microprocessor as they are received to determine their length. Additionally, avoiding the necessity of multiple instructions by the firmware to receive a message, or interrupts after the attention condition indicating an incoming message, would also be beneficial. It would further be desirable not to require additional, dedicated storage for such automated receipt of unexpected messages.

SUMMARY OF THE INVENTION

In a SCSI controller, unexpected messages are automatically received in response to an attention signal by receiving all of the bytes constituting the message and storing those bytes in an available register file selected from a plurality of register files in the controller. Once the entire message has been received and stored, a determination of an appropriate response is initiated. The register files are also used to hold selection information during a bus-initiated selection, so additional storage is not required.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
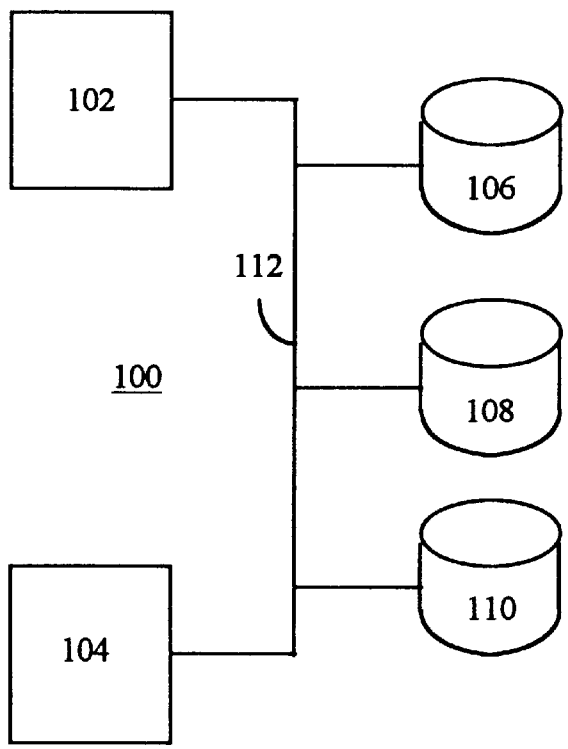
FIG. 1 depicts a data processing system in which a preferred embodiment of the present invention may be implemented.

With reference now to the figures, and in particular with reference to FIG. 1, a data processing system is depicted in which a preferred embodiment of the present invention may be implemented. Data processing system 100 includes computer systems 102 and 104 connected to subsystems 106, 108, and 110. These subsystems are disk drive subsystems in the depicted example. Computer systems 102 and 104 are connected to subsystems 106, 108, and 110 by bus 112. According to the present invention, bus 112 may be implemented using a number of different bus architectures, such as a SCSI bus or a fiber channel bus.

Figure 2:
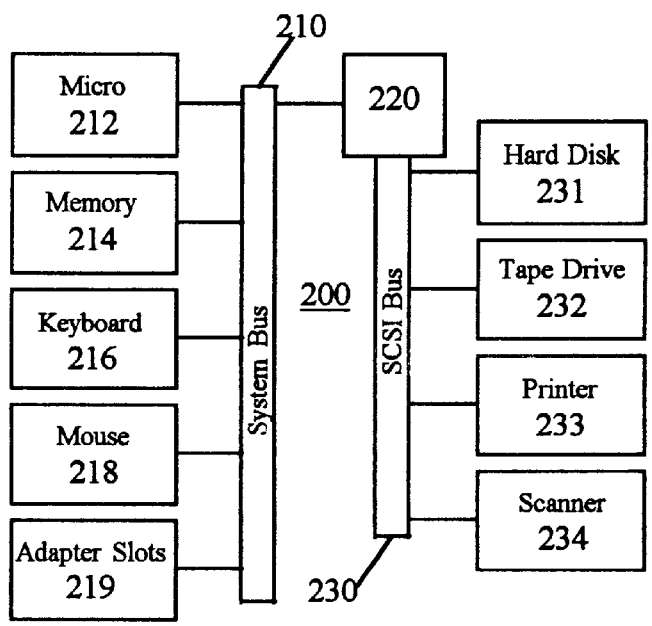
FIG. 2 is a block diagram of an alternative embodiment of a data processing system in which a preferred embodiment of the present invention may be implemented.

Referring to FIG. 2, an alternative embodiment of a data processing system in which a preferred embodiment of the present invention may be implemented is illustrated. Data processing system 200 includes a system bus 210 connecting microprocessor 212, memory 214, keyboard 216, a pointing device such as mouse 218, adapter slots 219, and other system components not shown. Adapter slots 219 may optionally be used to connect data processing system 200 to an external SCSI bus linking multiple computer systems and/or peripherals as depicted in FIG. 1.

Referring back to FIG. 2, also connected to system bus 210 through SCSI adapter 220 is SCSI bus 230. SCSI bus 230 may, in turn, be removably connected to up to fifteen additional peripherals such as hard disk 231, backup tape drive 232, printer 233, scanner 234, and other input/output peripheral devices. Those skilled in the art will recognize that any number of configurations of data processing systems which utilize a SCSI bus are possible.

Figure 3:
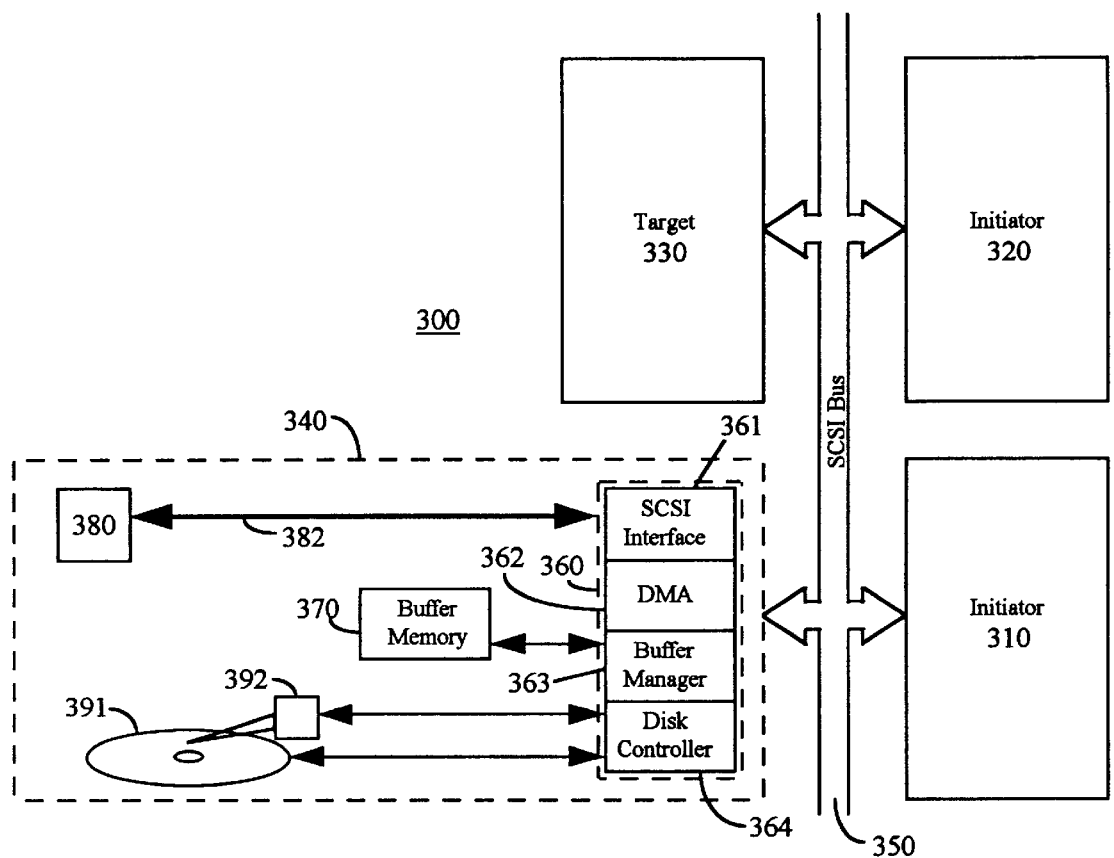
FIG. 3 depicts one possible bus configuration for a data processing system in which a preferred embodiment of the present invention may implemented.

With reference now to FIG. 3, a simplified block diagram showing one possible bus configuration for a data processing system in which a preferred embodiment of the present invention may implemented is depicted. The SCSI bus configuration 300 includes both initiator devices 310, 320 as well as target device 330, 340 coupled to a SCSI bus 350. Target device 340 is a hard disk computer peripheral device in the depicted example comprising a controller 360, a buffer memory 370, a microprocessor 380, a hard disk 391, and a hard disk servo 392. Controller 360 includes functional blocks such as SCSI interface portion 361, DMA engine 362, buffer manager 363, and disk controller 364. These functional blocks, as well as others not shown, may be implemented in a number of different ways depending on the particular application. Controller 360 includes interfaces to buffer memory 370, microprocessor 380, a read/write interface to hard disk 391, and hard disk servo 392. Microprocessor interface 382 is connected to and controls the functional blocks depicted as SCSI interface 361, DMA engine 362, buffer manager 363, and disk controller 364.

Figure 4:
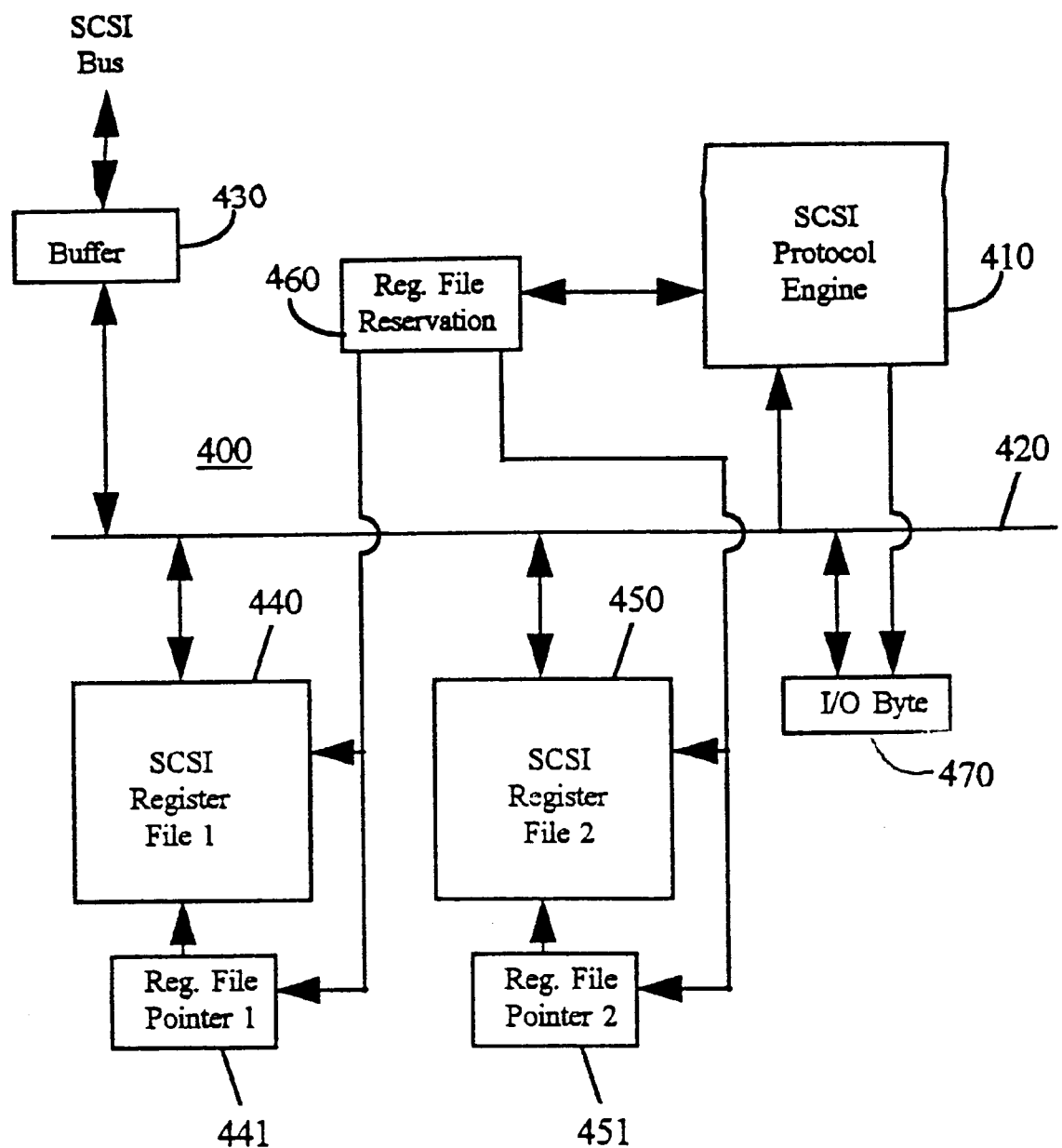
FIG. 4 is a block diagram of a portion of a bus controller in accordance with a preferred embodiment of the present invention.

Referring to FIG. 4, a block diagram of a portion of a SCSI controller in accordance with a preferred embodiment of the present invention is depicted. The portion of interest 400 includes a SCSI protocol engine 410 connected to a common channel 420, which is connected in turn to the SCSI bus via a buffer 430. Protocol engine 410 is a master state machine providing the requisite automated logic for sequencing through the SCSI phases and controlling the sending/receipt of message bytes. Register files 440 and 450, also connected to common channel 420, each can hold up to 20 bytes. These registers are used to hold selection information during bus initiated selection, unexpected messages during automated message receipt, and miscellaneous data for firmware directed instructions to protocol engine 410. Each register file 440, 450 has an associated register file pointer 441, 451, which are counters used to index register files 440 and 450. Register files 440 and 450, as well as protocol engine 410, are also connected to a register file reservation unit 460, which allows the register files 440 and 450 to be treated as a shared resource, to be arbitrated for and reserved prior to use. I/O byte unit 470, connected to protocol engine 410 and common channel 420, allows the firmware the flexibility of falling back to the conventional controller message mode of receiving one byte at a time.

The configuration depicted in FIG. 4 allows the firmware to control the fine details of the SCSI controller operation. The firmware may be message-based rather than byte-based, always handling whole messages at a time. If the initiator asserts an unexpected attention condition, such as during the command phase, data phase, or during selection after all expected messages have been received, the controller will automatically attempt to receive an entire message before interrupting the microprocessor.

Figure 5:
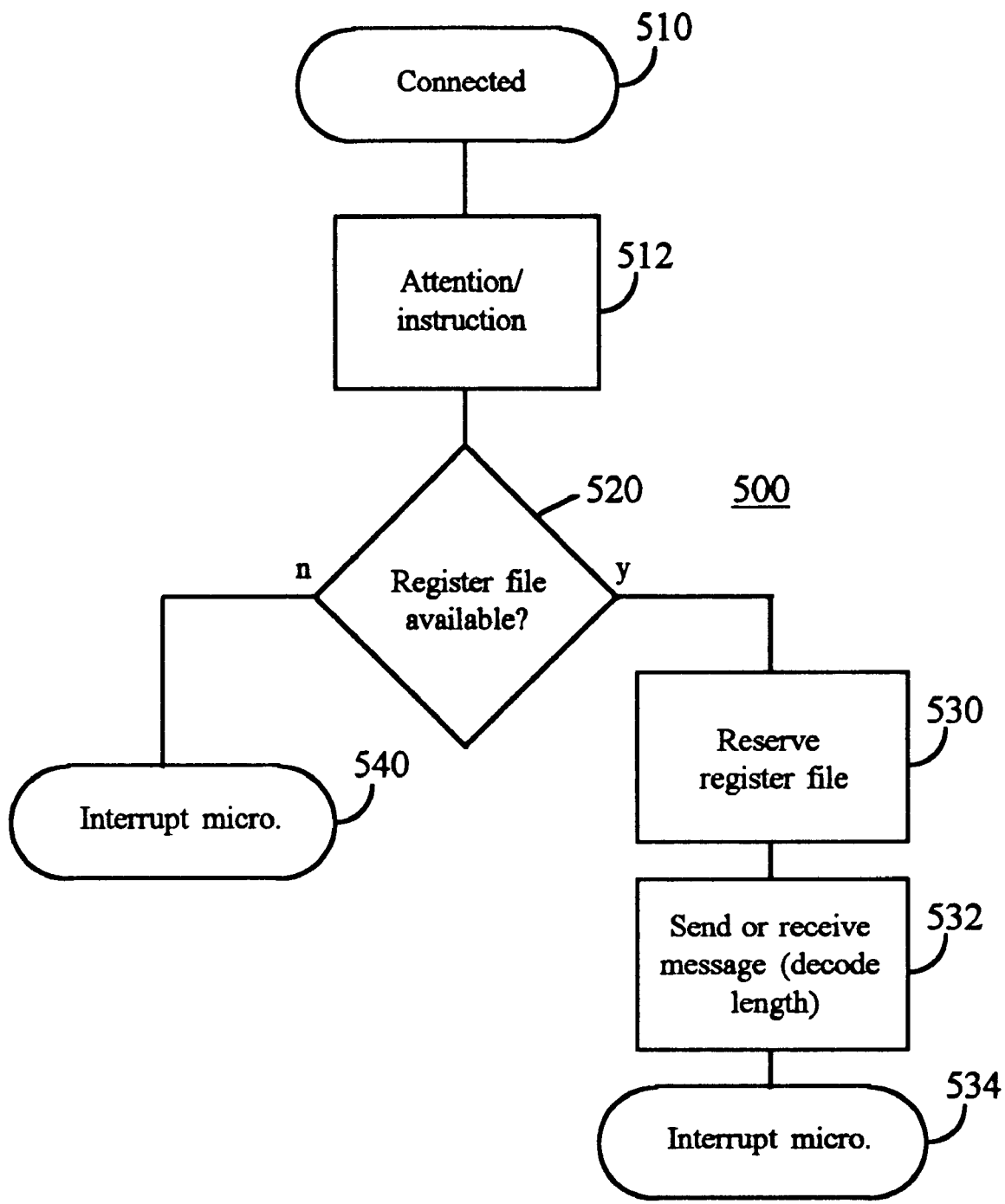
FIG. 5 depicts a high level flowchart for a process by which the firmware controls automatic receipt of unexpected messages in a SCSI target in accordance with a preferred embodiment of the present invention.

With reference now to FIG. 5, a high level flowchart for a process by which the firmware controls automatic receipt of unexpected messages in a SCSI target in accordance with a preferred embodiment of the present invention is illustrated. At the beginning of the process (step 510), the SCSI target is connected to an initiator device in response to a selection or reselection. The SCSI target, in this condition, receives an attention signal (step 512), indicating an unexpected incoming message. When an unexpected attention condition occurs on the SCSI bus, the hardware automatically arbitrates for a register file, seeking to determine if any are available (step 520).

If a register file is available, the hardware will reserve that register file (step 530) and automatically receive one entire message (step 532). The protocol engine will decode the message from the first byte to determine the length of the message. A handshake signal with the initiator sending the message is used to automatically receive the remainder of the message bytes.

Since the SCSI protocol includes no standard messages larger than 20 bytes the entire message can be received and stored in the reserved register file. Once the entire message is received, the hardware interrupts the microprocessor (step 534) for a determination of an appropriate response to the unexpected message.

Referring back to step 520, if no register file is available when the attention condition is received, the hardware immediately interrupts the microprocessor (step 540). In this case, the microprocessor may either proceed to read the message one byte at a time using the I/O byte register 470, or clear the reservation of one of the two register files and issue a "receive multiple byte message" instruction to receive the message into that register file.

The hardware is limited to receipt of only one unexpected message at a time. Since the SCSI protocol does not permit most messages to immediately follow previous messages, however, only one message at a time needs to be automatically received. This also prevents a requirement that each individual type of message be recognized as it is received. This is also a secondary motivation for decoding the length of the message to be automatically received, so that only one message is received.

The same resources used to receive unexpected messages are also used to send messages. Thus, referring back to step 510, if the target were connected an initiator, the firmware could issue an instruction to send or receive one message (up to 20 bytes) (step 512). The firmware would arbitrate for a register file (step 520), reserve an available register file if any existed (step 530), and send or receive one message (step 532). The same resources may similarly be used to receive and/or store CDBs.

Referring once again to step 530, if a register file is reserved for sending or receiving selection messages and an unexpected message arrives before the CDB (a common occurrence in SCSI protocol), the hardware reselects the same register file already reserved for selection messages to receive the unexpected message. The other register file may therefore remain reserved for a previous selection while the unexpected message is automatically received.

By sharing the register files between bus-initiated receipt of messages/CDBs and automatic receipt of unexpected messages, no addition to architecture cost is required for message handling. Resources are shared with other sequences common to SCSI controller operations.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method, in a SCSI controller, of automatically receiving messages, comprising:

in response to receiving a signal indicating transmission of an unexpected message, automatically receiving a plurality of message bytes constituting an entire message;

decoding a length of the entire message; and storing the plurality of message bytes in a register file in the controller.

2. The method of claim 1, wherein the plurality of bytes includes a first byte and the length of the entire message is decoded from the first byte.

3. The method of claim 1, wherein a remainder of the plurality of bytes excluding the first byte are automatically received and stored in the register file, the remainder of the plurality of bytes determined by the decoded length.

4. The method of claim 1, wherein the register file is selected from a plurality of register files in the controller.

5. The method of claim 4, further comprising:

determining whether a register file among the plurality of register files is available.

6. The method of claim 5, further comprising:

in response to determining that a register file among the plurality of register files is available, selecting the available register file; and in response to determining that no register file among the plurality of register files is available, sending a signal to a microprocessor to initiate a determination of whether a register file among the plurality of register files may be made available.

7. The method of claim 4, further comprising:

using the plurality of register files for sending or receiving bus-initiated messages.

8. The method of claim 4, further comprising:

using the plurality of register files for receiving a command descriptor block.

9. The method of claim 1, further comprising:

after receiving and storing the plurality of message bytes, sending a signal to a microprocessor to initiate a determination of an appropriate response.

10. A SCSI controller comprising:

a SCSI protocol engine connected to a plurality of conductors and controlling transmission and receipt of messages;

a register file connected to the plurality of conductors and containing unexpected messages during automated message receipt, wherein the controller, responsive to receiving a signal indicating transmission of an unexpected message, automatically receives a plurality of message bytes forming an unexpected message, the plurality of message bytes is determined by the decoded length.

11. The controller of claim 10, wherein the SCSI protocol engine further comprises:

logic for decoding a message length from a first byte of the unexpected message.

12. The controller of claim 10, further comprising:
a register file reservation unit reserving the register file responsive to receipt of the signal indicating transmission of the unexpected message.

13. The controller of claim 12, wherein the register file is a first register file, the controller further comprising:
a second register file, wherein the register file reservation unit reserves an available register file from the first and second register files upon receipt of the signal indicating transmission of the unexpected message.

14. The controller of claim 13, wherein a register file from the first and second register files contains selection information during bus initiated selection.

15. The controller of claim 10, further comprising:
a byte unit connected to the plurality of conductors and enabling the controller to receive one byte of an unexpected messages.

16. A method of handling unexpected SCSI messages in a data processing system, comprising:
responsive to receiving an signal indicating transmission of an unexpected message, determining if a register file within a plurality of register files is available; and
responsive to determining that a register file within the plurality of register files is available, automatically receiving a plurality of bytes forming the unexpected message.

17. The method of claim 16, wherein the step of automatically receiving a plurality of byte forming the unexpected message further comprises:
reserving an available register file for the unexpected message;
storing the plurality of bytes in the register file; and
generating a interrupt signal to initiate determination of an appropriate response to the unexpected message.

18. The method of claim 16, further comprising:
responsive to determining that no register file within the plurality of register files is available, generating an interrupt signal.

19. The method of claim 18, further comprising:
clearing a reservation of a register file within the plurality of register files; and
automatically receiving a plurality of bytes forming the unexpected message.

20. The method of claim 18, wherein the plurality of bytes received is responsive to a decoded length of the unexpected message.

* * * * *